US012375939B2

(12) United States Patent
Oki et al.

(10) Patent No.: US 12,375,939 B2
(45) Date of Patent: Jul. 29, 2025

(54) RADIO WAVE EMISSION SOURCE VISUALIZATION APPARATUS AND BAND EXPANSION METHOD

(71) Applicants: KABUSHIKI KAISHA TOSHIBA, Tokyo (JP); Toshiba Infrastructure Systems & Solutions Corporation, Kawasaki Kanagawa (JP)

(72) Inventors: Hidemi Oki, Ashigarashimo Kanagawa (JP); Katsuro Kasuga, Kawasaki Kanagawa (JP); Terumitsu Murakami, Kawasaki Kanagawa (JP)

(73) Assignees: Kabushiki Kaisha Toshiba, Tokyo (JP); Toshiba Infrastructure Systems & Solutions Corporation, Kawasaki Kanagawa (JP)

( * ) Notice: Subject to any disclaimer, the term of this patent is extended or adjusted under 35 U.S.C. 154(b) by 73 days.

(21) Appl. No.: 17/823,934

(22) Filed: Aug. 31, 2022

(65) Prior Publication Data

US 2022/0417766 A1 Dec. 29, 2022

Related U.S. Application Data

(63) Continuation of application No. PCT/JP2021/008795, filed on Mar. 5, 2021.

(51) Int. Cl.
*H04W 16/22* (2009.01)
*H04B 7/06* (2006.01)
*H01Q 3/24* (2006.01)

(52) U.S. Cl.
CPC .......... *H04W 16/22* (2013.01); *H04B 7/0602* (2013.01); *H01Q 3/247* (2013.01)

(58) Field of Classification Search
CPC ... H04W 16/22; H04B 7/0602; H04B 7/0691; H04B 17/23; H04B 17/29; H01Q 3/247;
(Continued)

(56) References Cited

U.S. PATENT DOCUMENTS

| 8,681,218 B1 * | 3/2014 | Jensen ................ H04N 23/631 |
| | | 342/55 |
| 2005/0146481 A1 | 7/2005 | Baliarda |

(Continued)

FOREIGN PATENT DOCUMENTS

| JP | 2001-183437 A | 7/2001 |
| JP | 2005-322972 A | 11/2005 |

(Continued)

OTHER PUBLICATIONS

European Patent Office, Extended European Search Report in EP 21767292.2, 13 Pages (Feb. 21, 2024).
(Continued)

*Primary Examiner* — Edan Orgad
*Assistant Examiner* — Malick A Sohrab
(74) *Attorney, Agent, or Firm* — Finnegan, Henderson, Farabow, Garrett & Dunner, LLP

(57) ABSTRACT

An apparatus includes antenna, selector, estimator, imager and creator. The antenna includes antenna elements of N rows by N columns (N is a natural number of 2 or more) arranged in an array and captures an incoming wave. The selector selects an antenna element group including antenna elements of M rows by M columns (M is a natural number less than N) from the antenna elements of N rows by N columns according to a band of the incoming wave. The estimator estimates an incoming direction of the incoming wave from an element signal of each of the antenna elements included in the selected antenna element group. The imager acquires image data by imaging an orientation direction of an aperture of the antenna. The creator creates a visualized image by visually synthesizing the estimated incoming direction with the image data.

10 Claims, 4 Drawing Sheets

(58) Field of Classification Search
CPC .......... H01Q 3/24; H01Q 5/42; H01Q 21/061; G01S 3/046; G01S 3/043; G01S 3/48
See application file for complete search history.

(56) References Cited

U.S. PATENT DOCUMENTS

| | | | |
|---|---|---|---|
| 2005/0250564 A1* | 11/2005 | Kishigami | H04B 7/086 |
| | | | 455/562.1 |
| 2010/0283702 A1 | 11/2010 | Lindmark et al. | |
| 2014/0036065 A1* | 2/2014 | Oakley | G01S 3/046 |
| | | | 348/135 |
| 2015/0048970 A1 | 2/2015 | Schoor | |
| 2015/0071310 A1 | 3/2015 | Kim et al. | |
| 2015/0229033 A1 | 8/2015 | Choi et al. | |
| 2016/0087349 A1 | 3/2016 | Lee et al. | |
| 2017/0170563 A1 | 1/2017 | Maas | |
| 2018/0088201 A1 | 3/2018 | Fujio | |
| 2020/0233093 A1 | 7/2020 | Tanaka | |
| 2021/0036428 A1* | 2/2021 | Ueda | H01Q 13/08 |

FOREIGN PATENT DOCUMENTS

| | | |
|---|---|---|
| JP | 2007-240445 A | 9/2007 |
| JP | 2009-232213 A | 10/2009 |
| JP | 2012-47473 A | 3/2012 |
| JP | 2012-78163 A | 4/2012 |
| JP | 2018-54386 A | 4/2018 |
| KR | 10-2015-0122967 A | 11/2015 |
| WO | WO 2017/006415 A1 | 1/2017 |
| WO | WO 2019/026374 A1 | 2/2019 |

OTHER PUBLICATIONS

Japan Patent Office, International Preliminary Report on Patentability of PCT/JP2021/008795 (Sep. 15, 2022), 4 pages.

Japan Patent Office, International Search Report issued in International Appl. No. PCT/JP2021/008795 (May 11, 2021), 3 pages, and English translation, 2 pages.

* cited by examiner

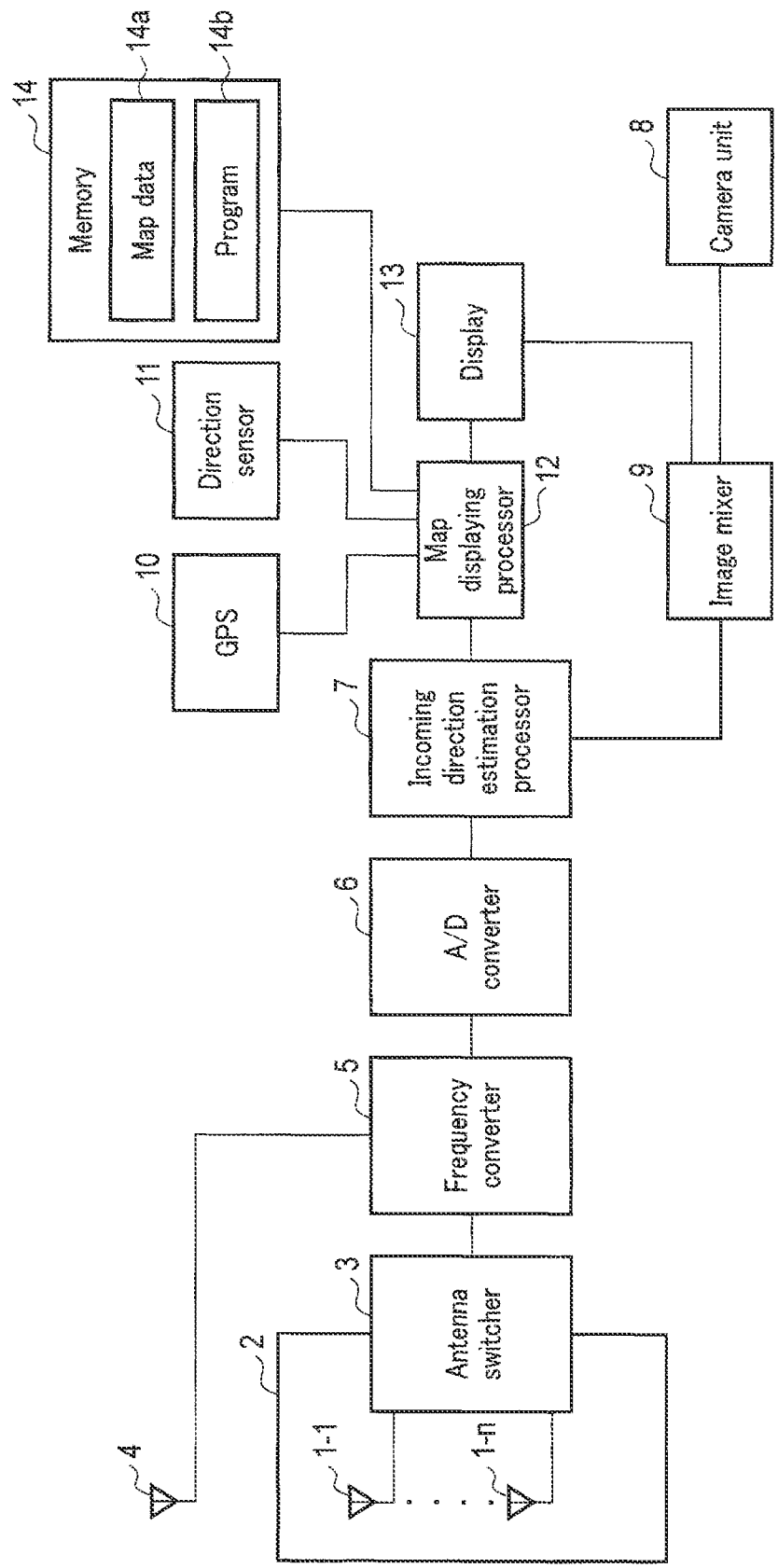
F I G. 1

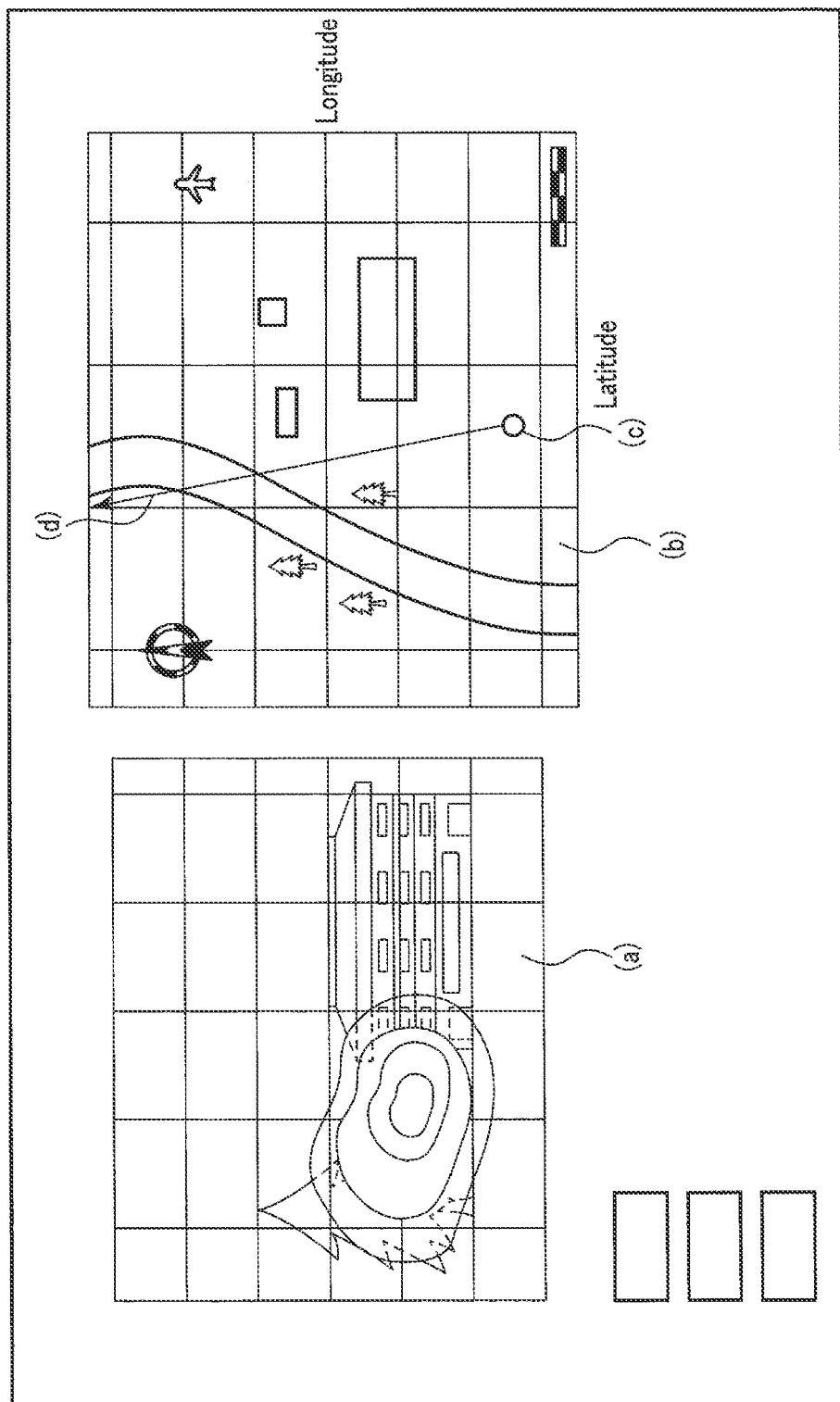
F I G. 2

RADIO WAVE EMISSION SOURCE VISUALIZATION APPARATUS AND BAND EXPANSION METHOD

CROSS-REFERENCE TO RELATED APPLICATIONS

This application is a Continuation Application of PCT Application No. PCT/JP2021/008795, filed Mar. 5, 2021 and based upon and claiming the benefit of priority from prior Japanese Patent Application No. 2020-040595, filed Mar. 10, 2020. The entire contents of which are incorporated herein by reference.

FIELD

Embodiments described herein relate generally to a radio wave emission source visualization apparatus and a band expansion method.

BACKGROUND

A radio wave emission source visualization apparatus can specify a radiation position of a radio wave in a desired band and display it so as to be superimposed on a camera image. For example, since it can pinpoint illegal radio waves and their position can be displayed, it is operated in public service agencies, etc. Since the illegal radio waves are transmitted at various frequencies, it is required to expand a frequency band that can be captured.

In this type of apparatus, it is considered sufficient to cover at most 700 MHz to 1500 MHz; however, in recent years, in addition to this, the apparatus is required to be able to cover a band of 1400 MHz to 2700 MHz. That is, while a band of one octave has been sufficient conventionally, an apparatus capable of covering a band of two octaves at once is required.

However, as is well known, in an array antenna 2, an arrangement at intervals of $\lambda/2$ with respect to a reception wavelength ($\lambda$) is ideal, and if an element interval is $\lambda/2$ or less, a peak of a visualization processing output becomes broad, and it becomes difficult to specify a radiation position. If $\lambda$ becomes close to the element interval, the peak of the visualization processing output becomes sharp, but a virtual image also appears. As described above, in a target band of the radio wave emission source visualization apparatus, conditions related to an antenna design are strict, and it is difficult to widen the band.

BRIEF DESCRIPTION OF THE DRAWINGS

FIG. 1 is a functional block diagram showing an example of a radio wave emission source visualization apparatus according to an embodiment.

FIG. 2 is a diagram showing an example of display in a display 13 in FIG. 1.

DETAILED DESCRIPTION

Figure 3:
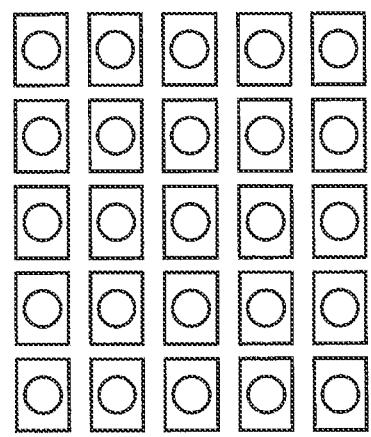
FIG. 3 is a diagram showing an example of an array antenna 2 viewed from an aperture face.

In general, according to one embodiment, a radio wave emission source visualization apparatus includes an antenna, a selector, an estimator, an imager and a creator. The antenna includes antenna elements of N rows by N columns (N is a natural number of 2 or more) arranged in an array and captures an incoming wave. The selector selects an antenna element group including antenna elements of M rows by M columns (M is a natural number less than N) from the antenna elements of N rows by N columns according to a band of the incoming wave. The estimator estimates an incoming direction of the incoming wave from an element signal of each of the antenna elements included in the selected antenna element group. The imager acquires image data by imaging an orientation direction of an aperture of the antenna. The creator creates a visualized image by visually synthesizing the estimated incoming direction with the image data.

FIG. 1 is a functional block diagram showing an example of a radio wave emission source visualization apparatus according to an embodiment. The radio wave emission source visualization apparatus of FIG. 1 includes an array antenna 2, an antenna switcher 3, a reference antenna 4, a frequency converter 5, an A/D (analog/digital) converter 6, an incoming direction estimation processor 7, a camera unit 8, an image mixer 9, a GPS receiver 10, a direction sensor 11, a map displaying processor 12, a display 13, and a memory 14.

The array antenna 2 includes N (N is a natural number of 2 or more) antenna elements 1-1 to 1-n arranged in an array, and captures radio waves (incoming waves) from a radio wave emission source. The antenna switcher 3 is, for example, a switching element such as a diode switch, and selectively switches the antenna elements 1-1 to 1-n according to a band of an incoming wave to be captured. That is, the antenna switcher 3 selects an antenna element group including M (M is a natural number of N or less) antenna elements from the antenna elements 1-1 to 1-n according to the band of the incoming wave.

The antenna elements 1-1 to 1-n and the reference antenna 4 all capture incoming waves in the same band and output element signals. The shape and type of the array antenna 2, the total number of antenna elements, intervals between the antenna elements 1-1 to 1-n, etc. are optimized according to a measurement target, a measurement purpose, etc.

If any one of the antenna elements 1-1 to 1-n is used as the reference antenna 4, a structure for separately attaching the reference antenna 4 can be omitted, which can contribute to reduction in size and weight.

The frequency converter 5 amplifies each element signal from the reference antenna 4 and the array antenna 2, and performs frequency conversion to an intermediate frequency band in which sampling is possible. The A/D converter 6 converts an analog signal frequency-converted by the frequency converter 5 into a digital signal.

The incoming direction estimation processor 7 estimates an incoming direction of an incoming wave captured by the array antenna 2. Specifically, the incoming direction estimation processor 7 detects a phase difference between an element signal of the reference antenna 4 and an element signal of each antenna element included in a selected antenna element group, and estimates the incoming direction of the incoming wave by, for example, a radio holography method. The incoming direction of the incoming wave estimated by the incoming direction estimation processor 7 indicates relative azimuth angle and elevation angle with respect to the direction of the array antenna 2.

The camera unit 8 is installed in the vicinity of the array antenna 2, and acquires image data by photographing an orientation direction of the aperture of the array antenna 2. If a mounting position of the camera unit 8 is away from a phase center of the array antenna 2, an accurate visualized image can be acquired by correcting a parallax.

The image mixer 9 generates a visualized image by visually synthesizing the incoming direction of the incoming wave estimated by the incoming direction estimation processor 7 with the image data acquired by the camera unit 8. That is, the image mixer 9 creates a visualized image by synthesizing an electric field intensity distribution on a two-dimensional plane of the incoming wave with the image data.

The GPS receiver 10 acquires position information of the array antenna 2. Specifically, the GPS receiver 10 receives a positioning signal from a GPS (Global Positioning System) satellite, and acquires position information such as latitude and longitude of the array antenna 2. The direction sensor 11 is, for example, a magnetic direction sensor, and acquires direction information of the array antenna 2 using geomagnetism.

The map displaying processor 12 acquires map information around the array antenna 2 based on the position information acquired by the GPS receiver 10. The map information can be acquired from map data 14a stored in advance in the memory 14. Alternatively, the map information may be acquired from a network such as the Internet.

The display 13 is, for example, a liquid crystal display (LCD), and displays a map indicating the incoming direction of the incoming wave received by the array antenna 2 and the position of the array antenna 2 based on the map information output by the map displaying processor 12. Further, the display 13 displays the visualized image generated by the image mixer 9.

Various controls for the array antenna 2, antenna switcher 3, reference antenna 4, frequency converter 5, A/D (analog/digital) converter 6, incoming direction estimation processor 7, camera unit 8, image mixer 9, GPS receiver 10, direction sensor 11, map displaying processor 12, and display 13, or arithmetic processing by software is realized by a program 14b stored in the memory 14.

FIG. 2 is a diagram showing an example of display on the display 13 in FIG. 1. The display 13 displays, for example, a camera window (a) and a map window (b).

The camera window (a) displays a superimposed image in which distribution of electric field intensity of an incoming wave on a two-dimensional plane is synthesized with an image captured by the camera unit 8. In the camera window (a), the electric field intensity of the estimated incoming wave is drawn approximately on contour lines around an incoming direction estimated by the incoming direction estimation processor 7. An image (color map) created with different display colors according to the electric field intensity may be displayed.

In the map window (b), a position (c) of the radio wave emission source visualization apparatus acquired by the GPS receiver 10 is displayed by being superimposed on the peripheral map acquired from the map data 14a. Further, in the map window (b), an arrow is drawn from the position (c) of the radio wave emission source visualization apparatus to a position (d) of a radio wave emission source. According to the map window (b), this arrow indicates that the radio wave emission source is located slightly to the left of a person searching. This also corresponds to the visualization screen (a).

FIG. 3 is a diagram showing an example of the array antenna 2 viewed from the aperture face. The array antenna may have, for example, 25 antenna elements of 5 rows by 5 columns.

Here, consider capturing an incoming wave in a band ranging from 700 MHz to 2700 MHz, for example. In the existing technology, for example, it is necessary to divide the band as shown in the following (1) and (2) and to provide a dedicated array antenna for each band.
(1) 700 MHz to 1500 MHz
(2) 1400 MHz to 2700 MHz Therefore, in the embodiment, a broadband antenna that covers the frequency bands (1) and (2) is used, and an antenna array is selected from a plurality of antenna arrays according to the reception frequency so that the element interval can be optimized.

Figure 4:
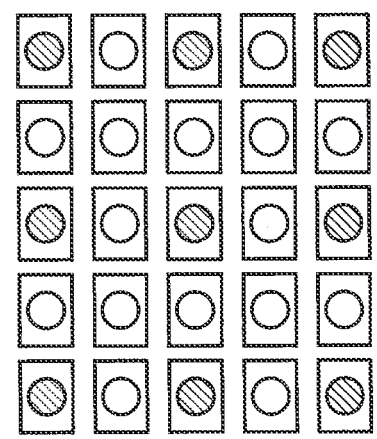
FIG. 4 is a diagram showing an example of antenna elements selected when capturing a band on a low frequency side.
Figure 5:
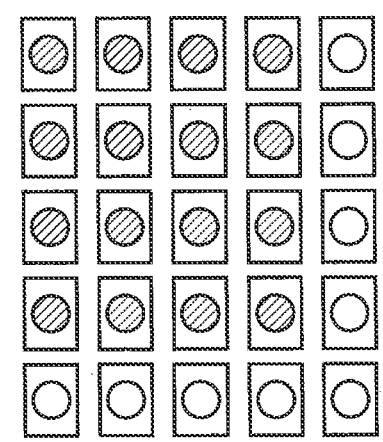
FIG. 5 is a diagram showing an example of antenna elements selected when capturing a band on a high frequency side.

As shown in FIG. 4, when the band (1) is captured, a 3×3 array of antenna elements indicated by hatching (hatched lines) in the figure is selected, and an incoming radio wave direction is calculated from an element signal from each antenna element of this antenna element group. On the other hand, when the band (2) is captured, a 4×4 array of antenna elements indicated by hatching (hatched lines) in FIG. 5 is selected, and an incoming radio wave direction is calculated from an element signal from each antenna element of this antenna element group.

In this way, by selecting the antenna elements according to the band of the incoming wave to be captured and switching the antenna array, the intervals between the antenna elements can be adaptively set. As a result, two array antennas are integrated into one array antenna, and it is possible to observe an incoming broadband wave extending from 700 MHz to 2700 MHz, for example, using the common array antenna.

In the array antenna, an array arrangement at intervals of $\lambda/2$ with respect to a reception wavelength ($\lambda$) is ideal. If the element interval is $\lambda/2$ or less, a peak of a visualization processing output becomes broad and it becomes difficult to specify a radiation position. Further, if $\lambda$, becomes close to the element interval, the peak of the visualization processing output becomes sharp, but a virtual image is also displayed. Thus, in the existing technology, an upper limit of a reception frequency range is a frequency twice that of a lower limit frequency, and the antenna elements are arranged in an array at intervals of $\lambda/2$ with respect to a wavelength at a center frequency. For this reason, the receivable band is naturally limited.

In contrast, in the embodiment, the antenna switcher 3 selects an antenna element group including antenna elements arranged at about half-wave intervals with respect to the wavelength of the incoming wave, so that the incoming wave can be captured by the antenna elements arranged in an array at the intervals of $\lambda/2$ with respect to the reception wavelength $\lambda$. For these reasons, according to the embodiment, it is possible to provide a radio wave emission source visualization apparatus and a band expansion method that achieve a wider band.

Note that the present invention is not limited to the embodiment described above. For example, the display 13 can be realized by a screen of a notebook personal computer separate from the radio wave emission source visualization apparatus. Alternatively, it may be a screen of a tablet. Further, the camera window (a) and the map window (b) do not need to be displayed together on the same screen, and the screen may be switched in response to a user's operation or the like.

The display method by the display 13 is not limited to the above-described method, and various modifications can be made. For example, the display 13 may display the incoming radio wave direction in the camera window (a) with a number, a symbol, a mark, or the like other than the color corresponding to the electric field intensity. Further, the display 13 may use a map in which various pieces of information other than buildings are described in the map window (b).

Further, it is also possible to take measures against multipath propagation.

Figure 6:
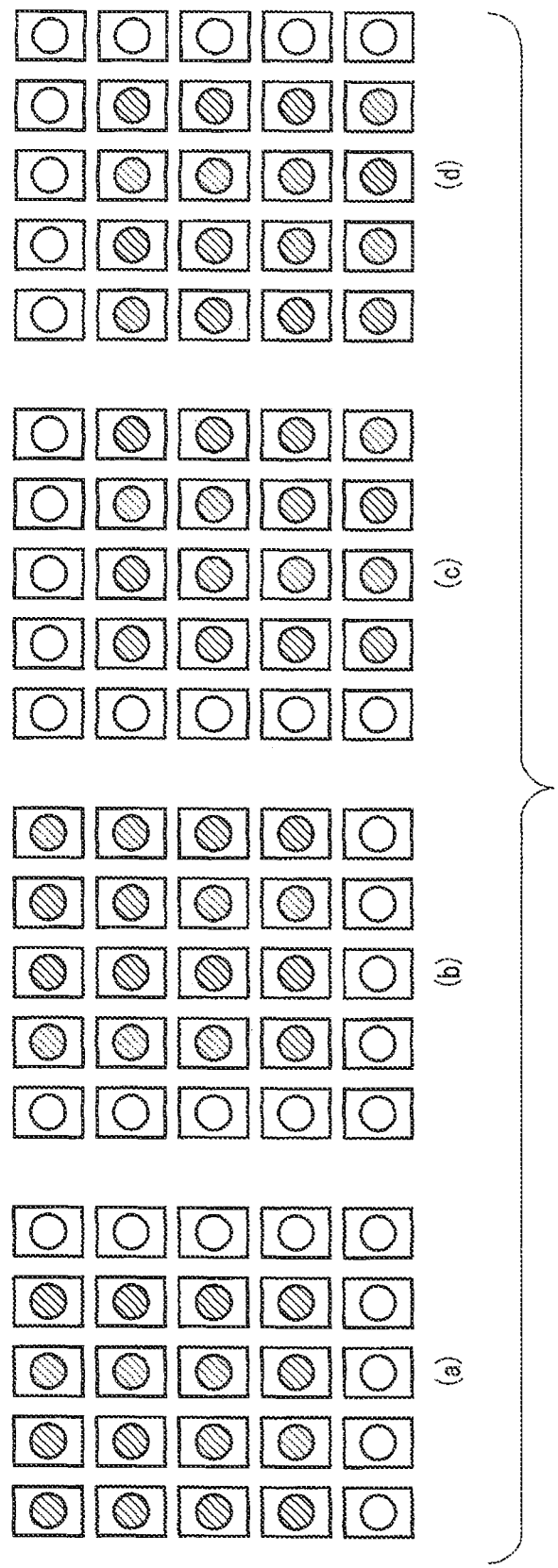
FIG. 6 is a diagram for explaining that a plurality of antenna element groups can be formed.

FIG. 6 is a diagram for explaining that a plurality of antenna element groups can be formed. In the 5×5 array antenna, as shown in FIGS. 6 (a), 6 (b), 6 (c), and 6 (d), the 4×4 array antenna element group can be switched in four ways. The antenna switcher 3 selectively switches these plurality of antenna element groups, and switches and outputs the element signals from the antenna element groups. Then, the incoming direction estimation processor 7 averages the element signals from the antenna element groups to estimate an incoming direction of an incoming wave. In this way, it is possible to average and cancel an influence of multipath propagation generated in each antenna element group. As a result, it is possible to enhance resistance to an environment in which multipath propagation is likely to occur, such as an urban area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A radio wave emission source visualization apparatus comprising:
an antenna including antenna elements of N rows by N columns arranged in an array and configured to capture an incoming wave, wherein N is a natural number of 2 or more;
a selector switch configured to select an antenna element group from a plurality of different antenna element groups each of the antenna element groups including antenna elements of M rows by M columns from the antenna elements of N rows by N columns according to a band of the incoming wave, wherein M is a natural number less than N;
an estimation processor configured to estimate an incoming direction of the incoming wave from an element signal of each of the antenna elements included in the selected antenna element group;
a camera configured to acquire image data by imaging an orientation direction of an aperture of the antenna; and
map displaying processor configured to create a visualized image by visually synthesizing the estimated incoming direction with the image data.

2. The radio wave emission source visualization apparatus according to claim 1, wherein the antenna elements of the selected antenna element group are arranged at about half-wave intervals with respect to a wavelength of the incoming wave.

3. The radio wave emission source visualization apparatus according to claim 1, wherein the map displaying processor is configured to create the visualized image by synthesizing an electric field intensity distribution of the incoming wave on a two-dimensional plane with the image data.

4. The radio wave emission source visualization apparatus according to claim 1, wherein
the selector switch is configured to switch and output element signals from the plurality of different antenna element groups, and
the estimation processor is configured to estimate the incoming direction by averaging the element signals from the antenna element groups.

5. The radio wave emission source visualization apparatus according to claim 1, further comprising a display configured to display the visualized image.

6. A method for expanding a band of a radio wave emission source visualization apparatus comprising antenna elements of N rows by N columns arranged in an array and an antenna configured to capture an incoming wave, the method comprising:
selecting, by the radio wave emission source visualization apparatus, an antenna element group from a plurality of different antenna element groups each including antenna elements of M rows by M columns from the antenna elements of N rows by N columns according to a band of the incoming wave, wherein N is a natural number of 2 or more, and M is a natural number less than N;
estimating, by the radio wave emission source visualization apparatus, an incoming direction of the incoming wave from an element signal of each of the antenna elements included in the selected antenna element group;
acquiring, by the radio wave emission source visualization apparatus, image data by imaging an orientation direction of an aperture of the antenna by an imager; and
creating, by the radio wave emission source visualization apparatus, a visualized image by visually synthesizing the estimated incoming direction with the image data.

7. The band expansion method according to claim 6, wherein the antenna elements of the selected antenna element group are arranged at about half-wave intervals with respect to a wavelength of the incoming wave.

8. The band expansion method according to claim 6, wherein the radio wave emission source visualization apparatus creates the visualized image by synthesizing an electric field intensity distribution of the incoming wave on a two-dimensional plane with the image data.

9. The band expansion method according to claim 6, comprising:
switching and outputting, by the radio wave emission source visualization apparatus, element signals from the plurality of different antenna element groups; and
estimating, by the radio wave emission source visualization apparatus, the incoming direction by averaging the element signals from the antenna element groups.

10. The band expansion method according to claim 6, further comprising displaying the visualized image on a display.

* * * * *